UNITED STATES PATENT OFFICE.

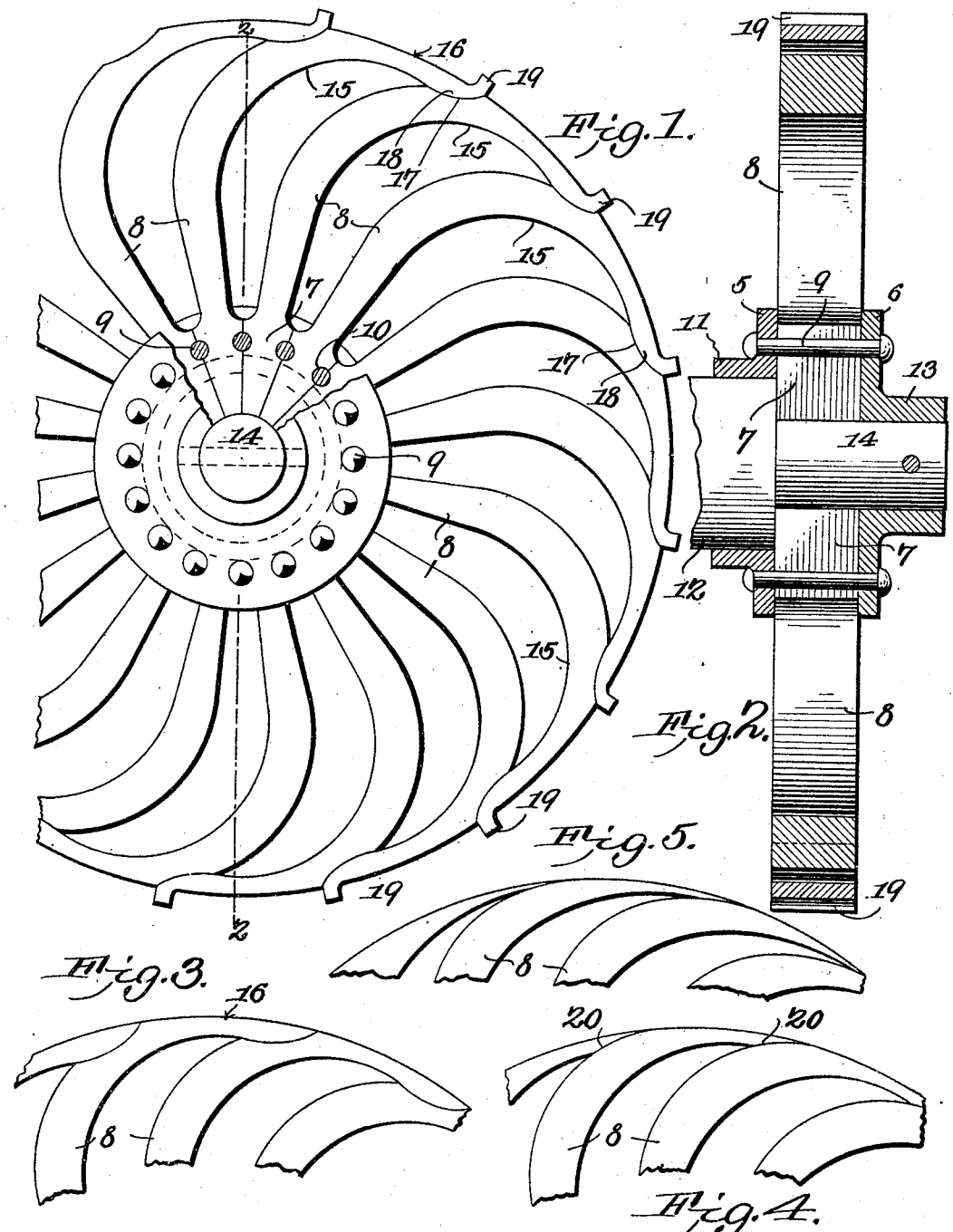

EDWIN C. PERKINS, OF PRAIRIE DU SAC, WISCONSIN, ASSIGNOR OF ONE-HALF TO JOHN KAUFMAN, OF PRAIRIE DU SAC, WISCONSIN.

RESILIENT WHEEL.

No. 832,558.　　　　Specification of Letters Patent.　　　　Patented Oct. 2, 1906.

Application filed January 18, 1906. Serial No. 296,710.

*To all whom it may concern:*

Be it known that I, EDWIN C. PERKINS, a citizen of the United States, residing at Prairie du Sac, in the county of Sauk and State of Wisconsin, have invented a new and useful Resilient Wheel, of which the following is a specification.

This invention relates to wheels for wagons, automobiles, traction-engines, and other vehicles, and has for its object to provide a strong, durable, and efficient wheel of this character having yieldable spokes, so as to prevent undue injury to the wheel in traveling over rough or uneven roads.

A further object of the invention is to provide a wheel in which the spokes, cushioning elements, and tread-surface are formed by radially-disposed springs, the free ends of which overlap each other and form the periphery or tread-surface of the wheel.

A further object is to provide a wheel in which the several spokes are independently mounted in the hub and provided with terminal traction-lugs adapted to prevent slipping or sliding of the wheel.

A still further object is to generally improve the class of devices so as to increase their utility and durability as well as reduce the cost of manufacture.

With these and other objects in view the invention consists in the construction and novel combination and arrangement of parts hereinafter fully described, illustrated in the accompanying drawings, and pointed out in the claims hereto appended, it being understood that various changes in form, proportions, and minor details of construction may be resorted to without departing from the principle or sacrificing any of the advantages of this invention.

In the accompanying drawings, forming a part of this specification, Figure 1 is a front elevation, partly in section, of a portion of a wheel constructed in accordance with my invention. Fig. 2 is a vertical sectional view taken on the line 2 2 of Fig. 1. Fig. 3 is a front elevation of a portion of a wheel, illustrating a modified form of the invention. Fig. 4 is a similar view illustrating a further modified construction, and Fig. 5 is a front elevation illustrating a still further modification.

Similar numerals indicate corresponding parts in all of the figures of the drawings.

The improved wheel comprises a suitable hub, consisting of a pair of spaced plates or disks 5 and 6, spaced apart to receive the enlarged heads 7 of the spokes 8 and connected together by transverse bolts or similar fastening devices 9, which engage circular recesses 10, formed in the inclined or tapered edges of the spoke-heads, as shown.

The inner plate or disk 5 is preferably formed with an integral flange or extension 11, adapted to bear against the axle 12, while the outer plate 6 is provided with a similar flange 13 of less diameter than the flange 11 and adapted to bear against the spindle 14.

The spokes 8 are preferably formed of spring metal and extend radially from the hub, as shown, said spokes being independently mounted in the hub and having their free ends curved laterally at 15 to form the periphery or tread-surface of the wheel, as indicated at 16. The curved or deflected end of each spoke is provided with a recess or depression 17, adapted to receive the curved or rounded face 18 of the adjacent spoke, so that when the several spokes are in position the free ends thereof will overlap each other and form, in effect, a continuous tread-surface, as shown. The free ends of the spokes are formed with laterally-projecting traction spurs or lugs 19, which extend transversely across the tread-surface of the wheel and serve to prevent the wheel from slipping or sliding when traveling over wet or muddy roads.

By having the ends of the spokes overlapping each other, as shown, the use of a separate tire is dispensed with, while the recesses or depressions 17 permit the free ends of the spokes to lie flush with each other, and thus present a practically smooth and continuous tread-surface. It will thus be seen that as the wheel revolves the weight of the vehicle will successively depress the several spokes and thereby yieldably support the vehicle-body, thus dispensing with use of bolster-springs and also preventing undue injury to the wheel.

In Fig. 3 of the drawings there is illustrated a modified form of the invention, in which the terminal traction lugs or spurs are dispensed with, this form of the device being particularly designed for carriage or wagon wheels. In Fig. 4 there is shown a further modification, in which the ends of the resilient spokes are concaved at 20 to receive the convex portion of the adjacent spoke, while in Fig. 5 the free or deflected ends of the spokes are made relatively thin and long, so as to overlap each other without the use of the seating depressions shown in Figs. 1 and 2.

It will of course be understood that the wheels may be constructed in different sizes and that the width and strength of the spokes both at the hub and tread-surface will depend upon the weight to be sustained. It will also be understood that the lap of the springs at the tread-surface of the wheel may be varied according to the style of the wheel and the use for which it is designed.

Having thus described the invention, what is claimed is—

1. A wheel having the spokes thereof extended to form a tread-surface, said spokes being provided with recesses for the reception of the ends of the adjacent spokes.

2. A resilient wheel comprising a hub, and spokes secured to the hub and having their free ends extended laterally and each provided with a recess for the reception of the end of the adjacent spoke.

In testimony that I claim the foregoing as my own I have hereto affixed my signature in the presence of two witnesses.

EDWIN C. PERKINS.

Witnesses:
J. S. TRIPP,
C. I. KINDSCHI.